United States Patent
Stookey

[11] 3,902,465
[45] Sept. 2, 1975

[54] ROTARY ENGINE
[76] Inventor: Byron O. Stookey, Huntington Mills, Pa.
[22] Filed: Feb. 4, 1974
[21] Appl. No.: 440,078

[52] U.S. Cl. ............... 123/8.17; 123/8.23; 418/241
[51] Int. Cl.² ........................................ F02B 53/08
[58] Field of Search ......... 60/39.61; 123/8.17, 8.23, 123/8.41, 8.35; 418/241

[56] References Cited
UNITED STATES PATENTS

| | | | |
|---|---|---|---|
| 1,185,473 | 5/1916 | Buckley | 418/241 X |
| 1,486,906 | 3/1924 | Kolar | 418/241 |
| 1,688,816 | 10/1928 | Kraus | 123/8.41 |
| 3,215,129 | 11/1965 | Johnson | 123/8.23 |
| 3,726,259 | 4/1973 | Graves | 123/8.41 X |

FOREIGN PATENTS OR APPLICATIONS

| | | | |
|---|---|---|---|
| 1,451,839 | 8/1969 | Germany | 123/8.17 |

*Primary Examiner*—C. J. Husar
*Assistant Examiner*—Michael Koczo, Jr.

[57] ABSTRACT

A rotary internal combustion engine comprising three distinct units in spaced parallel relation, a compression unit, a combustion unit, and a power unit, each unit consisting of a cylindrical housing containing a rotor of circular shape, the three rotors all being mounted securely upon a common straight shaft extending through all three units. The rotors of the compression and power units are mounted eccentrically within their cylinders to create crescent-shaped compression and expansion chambers respectively, and are provided with flat vane-type pistons projecting slideably through the rim of each rotor to divide the total displacement volume of each cylinder into several individual chambers, to compress the fuel mixture ahead of the pistons in the compression unit, and to receive the force of the expanding gas in the power unit to turn that rotor, and through the shaft to turn the other two rotors, and to provide power for external use. The compression unit and the power unit are completely separated by the combustion unit, wherein ignition of each fuel charge takes place and combustion begins. The rotor of the combustion unit is mounted concentrically within its cylinder and provided with arc-shaped chambers, sealed with packing rings, to receive each charge of compressed fuel mixture from the compression unit through a port and sleeve connecting the combustion and compression units. The compressed fuel charge then in the combustion chamber is ignited by a spark plug at the right time, and as the rotor rotates to uncover the port and sleeve leading to the power unit, the expanding gas rushes into the power unit to push against the pistons thereof to turn the rotor and create power. The combustion rotor is analogous to a rotating cylinder head in a conventional reciprocating engine.

1 Claim, 6 Drawing Figures

ROTARY ENGINE

This invention relates to rotary internal combustion engines. It is a primary object of this invention to provide an engine of this type that exhausts the burned combustion gases much later in the combustion cycle, relative to the conventional reciprocating engine, allowing more complete combustion of the fuel charge before exhaust, both to increase efficiency and to reduce substantially the emission of harmful pollutants into the atmosphere.

Another object of this invention is to provide for the complete separation of the compression and power phases of the combustion cycle to avoid the mixing of exhaust gas with the incoming fresh fuel mixture that takes place at the beginning of each intake stroke of the conventional engine.

A further object is to provide, in a rotary engine, ignition similar to that of the reciprocating engine wherein the compressed gas, or fuel mixture, is ignited at the point of greatest compression, or somewhat before this point, so that there is an appreciable interval for flame propogation in the compressed fuel mixture before it expands in the form of useful pressure against the moving piston.

An incidental object is to reverse the present trend toward extreme mechanical complexity — largely as a result of the stringent emission standards — by providing an engine so simple in design that it requires no gears, crankshaft, connecting rods or valves for its operation, as will be set forth in detail in the drawings and specification which follow.

Figure 1:
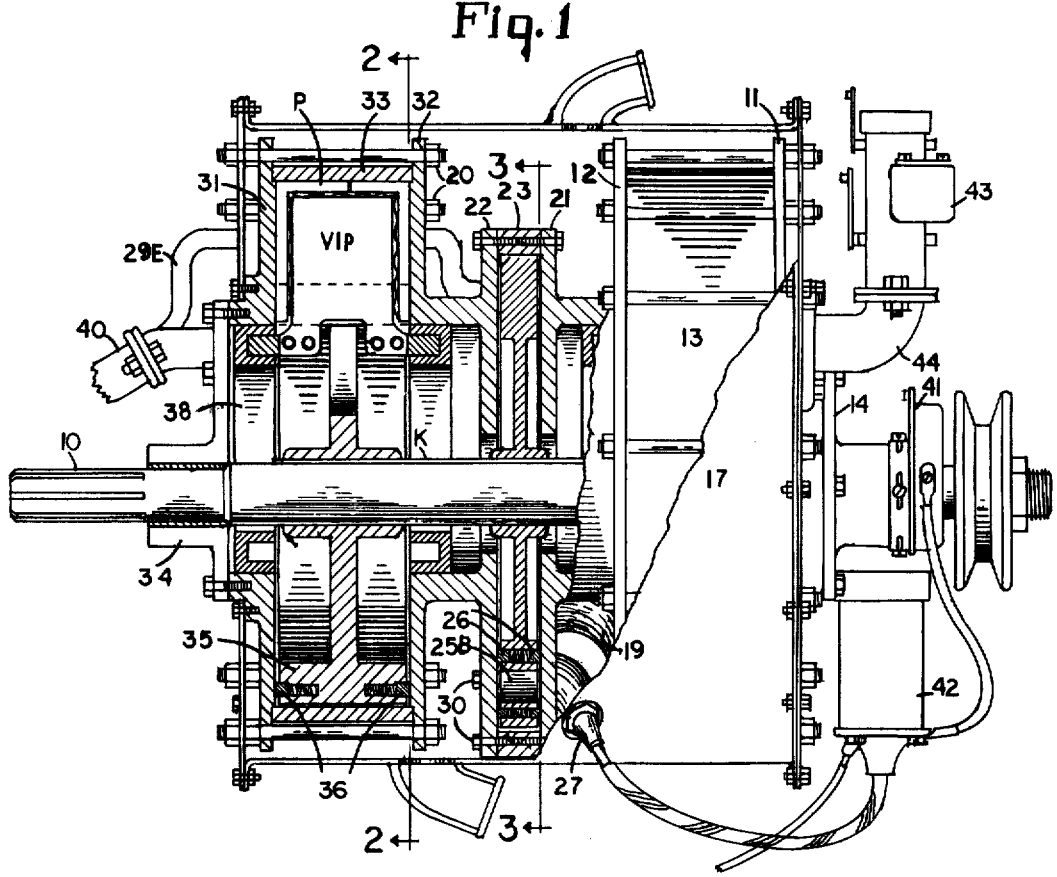
FIG. 1 is a side elevation of the engine, the combustion unit and the power unit appearing in vertical section on the center-line of the engine.

The engine consists essentially of three main units in spaced parallel relation. These are the compression unit, the combustion unit, and the power unit. The compression unit compresses the fuel mixture drawn in from the carburetor and delivers it through a sleeve to the combustion unit. In the combustion unit, which serves substantially the same purpose as the cylinder head and valve train of a conventional reciprocating engine, the compressed fuel mixture is ignited by a spark plug. After a slight time interval for flame propogation in the fuel mixture, the rapidly expanding gas is delivered through another sleeve to the power unit. In the power unit the expanding gas pushes against vane-type pistons projecting through the periphery of a rotor, causing the rotor, as well as the shaft on which the rotor is mounted, to revolve and deliver power for external use.

The three units are spaced one from another for two purposes; first, to keep the compression and power phases of the cycle completely separated; and second, to permit circulation of water or other cooling medium to dissipate excess heat and keep the various parts within reasonable operating temperatures.

The detailed construction of the engine, and its cycles of operation, can be understood more clearly by referring to the drawings.

Figure 2:
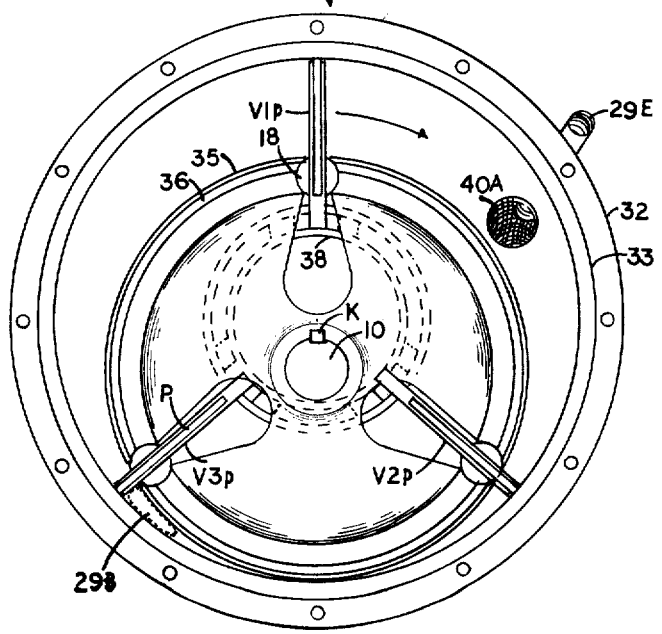
FIG. 2 is a transverse sectional view of the power unit taken on line 2—2 of FIG. 1.
Figure 3:
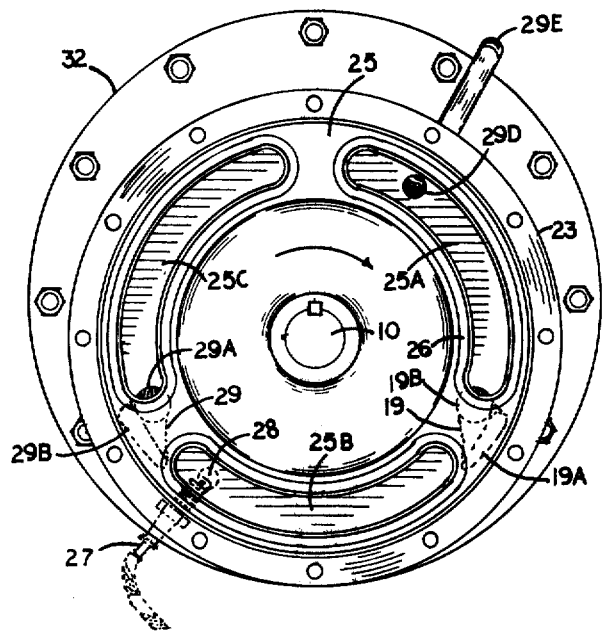
FIG. 3 is a transverse sectional view of the combustion unit taken on line 3—3 of FIG. 1.

The main shaft 10 is mounted eccentrically in relation to the compression and power cylinders 13 and 33, as shown in FIGS. 1 and 2, and concentrically within the combustion cylinder 23, as shown in FIGS. 1 and 3, being supported by suitable bearings in the bearing support plates 14 and 34 (FIG. 1). Upon this main shaft 10 are mounted the compression rotor 15 (FIG. 5), the combustion rotor 25 (FIGS. 1 and 3), and the power rotor 35 (FIG. 1). These rotors are secured to shaft 10 by keys K or other suitable means, such as splines. Therefore the shaft and all three rotors turn as a unit. The shaft projects out of the engine fore and aft to provide for accessory drive and power take-off.

Figure 5:
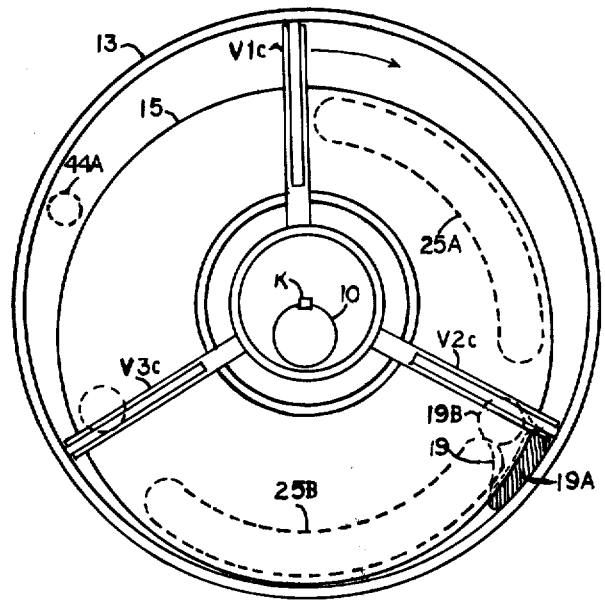
FIG. 5 is an outline section of the compression unit indicating the relative positions of the pistons and rotors at the end of each compression "stroke", or cycle.
Figure 6:
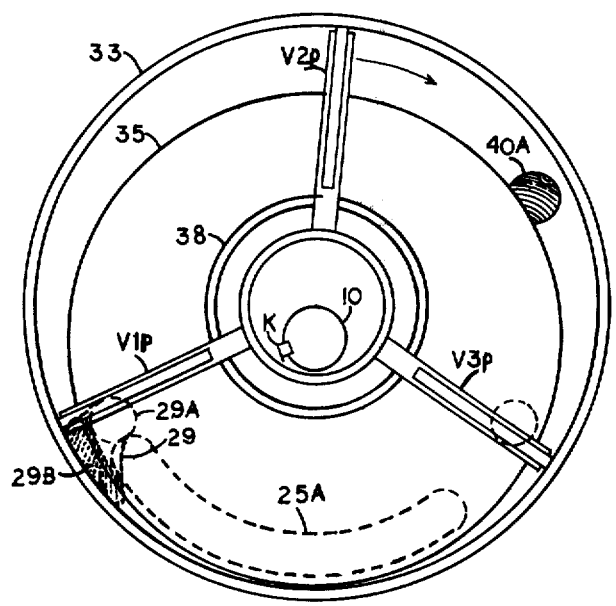
FIG. 6 is an outline section of the power unit indicating the relative positions of the pistons and rotors at the beginning of each power stroke, or cycle.

The power rotor 35, the cylinder 33, and the endplates 31 and 32 combine to form the crescent-shaped power chamber, as shown in FIGS. 1 and 2 and indicated on FIG. 6, while the compression rotor 15, the cylinder 13, and the end-plates 11 and 12 combine in the same way to form the crescent-shaped compression chamber, as indicated on FIG. 5.

The compression rotor 15 and the power rotor 35 are preferably identical in design, being symmetrical on the longitudinal axis, with a hub and comparatively thin web carrying a heavy rim as shown in FIGS. 1 and 2. This rim is in three equal sections, in the preferred design, being bored axially to accommodate the divided piston bushings 18 (FIG. 2) through which the pistons V1, V2, and V3 slide in and out as the rotor revolves. The bushings 18 also permit a slight oscillating motion of the pistons in relation to the rotor rim, as the pistons are mounted radially in the cylinders 13 and 33, and are not radial in relation to the rotors except at top and bottom centers. The central web of the rotors is also cut out at three places to accommodate the pistons as they slide in during rotation, as at V2p and V3p (FIG. 2). The rotors are provided with suitable rotor rings such as 36 (FIGS. 1 and 2) preferably spring-pressed to keep them in constant contact with end-plates 11, 12, 31, and 32 and render the crescent-shaped compression and power chambers air-tight. The above endplates are held firmly in position with tie-bolts 20.

The combustion rotor 25 is provided with three arc-shaped combustion chambers 25A, 25B, and 25C (FIG. 3) to receive the charges of fresh fuel mixture from the compression unit through the sleeve 19. The volume of each chamber is determined by the compression ratio desired. If the size of the chamber is reduced, the compression ratio of the engine will be raised accordingly, provided no other changes are made in the engine. It would be a comparatively simple matter to raise or lower the compression ratio of this engine merely by replacing the present combustion rotor with one having smaller or larger chambers. Each chamber is rendered gas-tight by suitable spring-pressed rotor-rings such as 26 (FIGS. 1 & 3) which are held in sliding contact with end-plates 21 and 22 and prevent the compressed fuel mixture, both before and during combustion, from escaping through the clearance space necessary between the rotor and the end-plates. The end-plates 21 and 22 are secured to the cylinder 23 with cap-screws 30.

Figure 4:
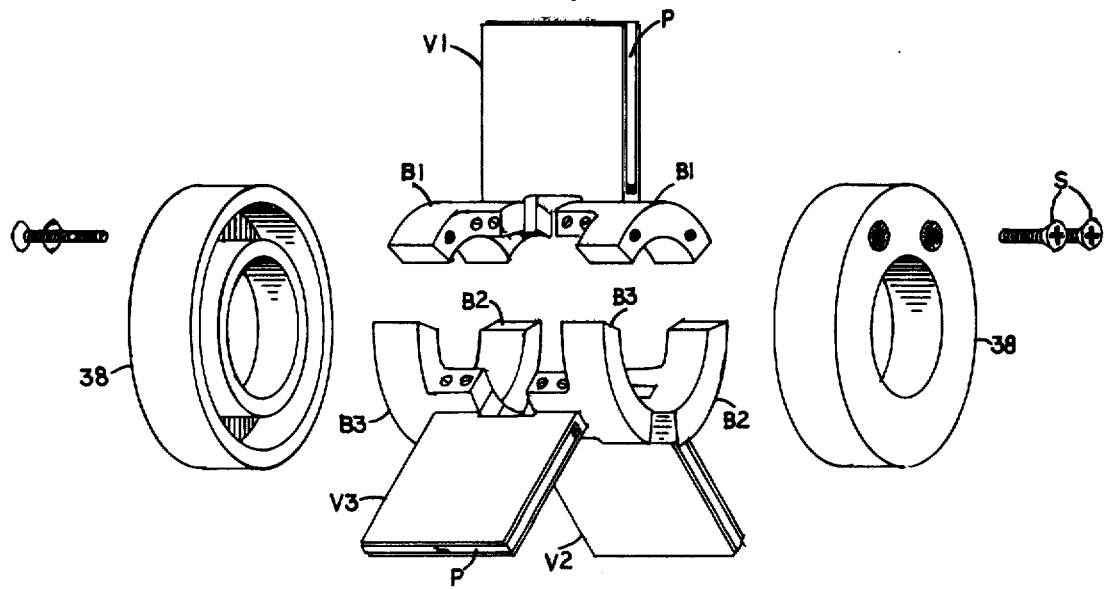
FIG. 4 is an exploded perspective view of the vane-type pistons, the trunnion-type piston supports, and the annular bearings into which the piston supports fit.

The vane-type pistons V1, V2, and V3 (FIG. 4) which divide the crescent-shaped compression and power chambers into three compartments each, are identical in design, but are located by small index letters on the drawings for clarity; V1$p$, for example, being Vane, or Piston No. 1 in the power unit, while V2$c$ is Piston No. 2 in the compression unit. The pistons are mounted rigidly on arc-shaped trunnion type supports B1, B2, and B3, which fit into channels in the annular bearings 38 on each side of the pistons. As machined, the piston supports B1, B2, and B3 are rotatable in the annular bearings 38, but for more satisfactory lubrication the piston supports B1 are anchored in the bearings by the screws S or other means, while the piston supports B2 and B3 are left free to oscillate in bearings 38 as the assembly revolves with the rotors 15 and 35.

The pistons V1, V2, and V3 are rendered gas-tight with the outer walls of the compression and power chambers by means of packing-strips P, while the piston bushings 18 prevent escape of pressure toward the center of the rotor. All the piston packing-strips and the rotor-rings, it will be noted, serve substantially the same purpose as the piston rings of a conventional reciprocating engine.

The cycles of operation are as follows: The shaft 10 is first rotated by external means such as a crank or starter, and the rotors 15, 25, and 35 together with the piston assemblies V1, V2, and V3 revolve in unison with the shaft. As the piston V1$c$ (FIG. 5) moves clockwise, in the direction indicated, that part of the compression chamber enclosed between V1$c$ and V3$c$ becomes progressively larger, with a consequent drop in pressure. The suction thus created draws fuel mixture into the said compartment from the carburetor 43 (FIG. 1) through the elbow 44 and the compression inlet port 44A, the position of which is indicated in FIG. 5 by a dotted circle, since it is in the near endplate not shown. As the rotor and pistons continue to revolve more fuel mixture is drawn into the said compartment until the piston V3$c$ has passed the port 44A. From this point forward the volume of the compartment progressively decreases, building up compression pressure until piston V1$c$ has reached the position of V2$c$, when the compression outlet port 19A is about to be uncovered. As soon as port 19A is uncovered by piston V1$c$, the pressure building up in the following compartment forces the fuel mixture out through the port 19A, the sleeve 19 (FIGS. 1, 3, 5) connecting the compression and combustion units, and into the combustion chamber 25A, which in the one-third revolution described above has reached the position shown in FIG. 3. The position of the combustion inlet port 19B, which of course is the outlet of sleeve 19, is indicated in FIGS. 3 and 5.

For a few degrees of rotation the combustion chamber 25A (FIG. 3) has uncovered both the inlet port 19B and the port 29D to the auxiliary exhaust line 29E, so that the fuel mixture entering the chamber through the inlet port 19B forces the products of the previous combustion still remaining in chamber 25A out through the auxiliary exhaust line in a process termed scavenging.

And since incomplete scavenging has plagued engine designers from the beginning with reduced efficiency, and more recently as one of the causes of undesirable exhaust emissions, this design is offered as a solution to both problems as referring to rotary engines.

The port 29D remains uncovered until the chamber 25A is completely exhausted of the products of previous combustion, whereupon the port is closed by rotation of the rotor 25 before any appreciable amount of fresh fuel mixture escapes through the exhaust line.

Continued rotation of the shaft, rotors and pistons brings piston V1$c$ and chamber 25A to the position of V2$c$ and 25B shown in FIG. 5, the point of greatest compression. By this time most of the fresh fuel mixture in the compartment between pistons V1$c$ and V2$c$ has been forced into combustion chamber 25A. With a few more degrees of rotation chamber 25A has reached the position of chamber 25B in FIG. 3, having passed the combustion inlet port 19B, and becomes a sealed chamber.

The compressed fuel mixture now in chamber 25A is ignited by spark plug 27 through spark plug elbow 28, the outlet of which is indicated in FIG. 3. The exact timing of the spark, which is controlled by variable timer 41 connected to the ignition coil 42, can be adjusted either manually or automatically. In effect, this is the exact condition obtaining in current reciprocating engines of the spark-ignition type, where the spark can be advanced — i.e. fired before top dead center — to allow an interval of time for flame propogation in the compressed fuel mixture before it expands in the form of useful pressure against the moving piston.

Ignition of the fuel charge can take place any time after combustion chamber 25A has uncovered the spark plug opening 28. The rotors and pistons continue to revolve as the flame spreads in chamber 25A, and as chamber 25A uncovers the combustion outlet port 29A the rapidly expanding fuel mixture rushes out through port 29A, sleeve 29, and into the power unit through port 29B, the position of which is indicated in FIGS. 3 and 6. FIG. 6 also shows the relative positions of combustion chamber 25A and the pistons in the power unit at the beginning of the power impulse, or stroke. The expanding fuel charge pushes against piston V1$p$ in the power unit, forcing the rotor to continue rotating in a clockwise direction and turning the shaft, thus developing power both to turn the other rotors and for external use.

At the end of the power impulse chamber 25A has reached the position of chamber 25C of FIG. 3 and is about to pass the outlet port 29A, while piston V1$p$ has reached the position shown in FIG. 2. In a few more degrees of rotation the next power impulse will begin, as the fresh fuel charge in chamber 29C has already been ignited. The process of combustion in the combustion unit, one chamber after another, is virtually continuous.

The products of combustion in the power unit are exhausted through exhaust port 40A into exhaust pipe 40, port 40A being placed quite late in the combustion cycle relative to the opening of the exhaust valve in a reciprocating engine. This resultant longer period of combustion — 200° of shaft rotation and up is readily achieved from ignition of the fuel charge to the uncovering of the exhaust port — allows more complete combustion of the fuel charge both to improve efficiency and to reduce exhaust emissions.

It is understood that when referring to the compression unit above compressing the "fuel mixture", the carburetor type of engine is being described. This engine lends itself equally well to fuel injection, in which air only would be compressed by the compressor and the fuel would be injected into the compressed air in sleeve 19 connecting the compression and combustion units, or adjacent thereto.

Having thus described my engine in detail, what I claim as new and wish to protect by Letters Patent is:

1. The combination, in a rotary internal combustion engine, of three distinct units in spaced parallel relation, a compression unit, a combustion unit, and a power unit, each unit consisting of a cylindrical housing containing a rotor of circular shape, the rotors of the compression and power units being mounted eccentrically within their cylinders to create crescent-shaped compression and expansion chambers respectively, each rotor of the compression and power units being provided with flat vane-type pistons projecting slideably through the rim of said last named rotors and fitted with suitable packing-strips on the edges to contact the side and annular walls of the cylinders and render their respective chambers gas-tight as the rotors and their pistons rotate within the cylinders, the compression unit and the power unit being completely separated by the combustion unit, wherein ignition of each fuel charge takes place and combustion begins, the rotor of the combustion unit being mounted concentrically within its cylinder and provided with arc-shaped chambers, sealed with packing-rings, to receive each charge of compressed fuel mixture from the compression unit through a sleeve and port connecting the compression and combustion units, means for mounting a spark plug in the housing of the combustion unit to ignite the compressed fuel charge at the right time, and a port and sleeve connecting the combustion unit to the power unit to conduct the expanding gas from each power impulse originating in the combustion rotor into the power unit to push against the pistons thereof and rotate the rotor, and means for exhausting the residual products of combustion from each combustion chamber before final compression and ignition of the next fuel charge, the number of chambers in the combustion unit being always equal to the number of pistons in the compression unit, and equal to the number of pistons in the power unit, the three rotors all being mounted securely upon a common straight shaft extending through all three units.

* * * * *